United States Patent [19]

Nowak et al.

[11] Patent Number: 4,941,340

[45] Date of Patent: Jul. 17, 1990

[54] METHOD OF FABRICATING WALL FASTENERS

[75] Inventors: Thomas E. Nowak, Elk Grove Village; Edward J. Smith, Arlington Heights, both of Ill.; Eustathios Vassiliou, 12 S. Townview La., Newark, Del. 19711

[73] Assignee: E. Vassiliou, Newark, Del.

[21] Appl. No.: 436,137

[22] Filed: Jan. 4, 1990

Related U.S. Application Data

[60] Continuation of Ser. No. 281,445, Dec. 8, 1988, abandoned, which is a division of Ser. No. 85,154, Aug. 14, 1987, Pat. No. 4,874,27, which is a continuation-in-part of Ser. No. 1,756, Jan. 9, 1987, Pat. No. 4,765,788.

[51] Int. Cl.$^5$ .............................................. B21G 3/26
[52] U.S. Cl. ........................................ 72/379.2; 10/34
[58] Field of Search ..................... 10/27 H, 27 PH, 28, 10/32, 34, ; 72/364, 379; 411/15, 30, 61, 446, 447, 448, 461, 462

[56] References Cited

U.S. PATENT DOCUMENTS

| | | | |
|---|---|---|---|
| 1,295,734 | 1/1919 | Grubel . | |
| 1,336,162 | 4/1920 | Royer et al. . | |
| 1,435,434 | 2/1922 | Voelker . | |
| 1,646,366 | 10/1927 | Carr . | |
| 1,646,367 | 10/1927 | Carr . | |
| 2,133,916 | 10/1938 | Churchill | 1/4 |
| 2,191,028 | 2/1940 | Miller et al. | 206/59 |
| 2,208,779 | 7/1940 | Timmerman | 85/2.4 |
| 2,296,046 | 9/1942 | Miller | 85/11 |
| 2,396,501 | 3/1946 | Gibson | 85/2.4 |
| 2,567,935 | 9/1951 | Hallock | 411/447 |
| 2,601,803 | 7/1952 | Newman | 85/38 |
| 2,620,537 | 12/1952 | Gobin dit Dandé | 24/213 |
| 2,720,135 | 10/1955 | Gisondi | 85/2.4 |
| 2,740,505 | 4/1956 | Flora | 411/446 X |
| 2,741,939 | 9/1951 | Hallock | 85/23 |
| 2,745,308 | 5/1956 | Gisondi | 85/13 |
| 2,919,915 | 11/1975 | Alexander | 85/68 |
| 3,148,579 | 9/1964 | Giovannetti | 85/83 |
| 3,431,813 | 3/1969 | Johnson | 85/83 |
| 3,522,756 | 8/1970 | von Wolff | 85/83 |
| 3,550,499 | 12/1970 | Eilesberger | 85/84 |
| 4,009,634 | 3/1977 | Barmore | 85/3 R |
| 4,088,054 | 5/1978 | Lippacher et al. | 85/84 |
| 4,203,193 | 5/1980 | Arthur | 29/526 R |
| 4,284,378 | 8/1981 | Mizusawa | 411/21 |
| 4,300,865 | 11/1981 | Murray | 411/15 |
| 4,322,194 | 3/1982 | Einhorn | 411/30 |
| 4,354,782 | 10/1982 | Newport | 411/61 |
| 4,500,238 | 2/1985 | Vassiliou | 411/30 |
| 4,595,325 | 6/1986 | Moray et al. | 411/173 |
| 4,601,625 | 7/1986 | Fust et al. | 411/387 |
| 4,773,804 | 9/1988 | Ausprung | 411/61 |

FOREIGN PATENT DOCUMENTS

| | | |
|---|---|---|
| 116844 | 9/1899 | Fed. Rep. of Germany . |
| 2454022 | 5/1976 | Fed. Rep. of Germany . |
| 1219317 | 5/1960 | France . |
| 401379 | 1/1943 | Italy . |
| 701524 | 2/1966 | Italy . |
| 543508 | 5/1986 | Italy . |
| 46-17656 | 1/1971 | Japan . |
| 1284595 | 8/1972 | United Kingdom . |
| 2027834 | 2/1980 | United Kingdom . |
| 711095 | 6/1984 | United Kingdom . |

*Primary Examiner*—E. Michael Combs
*Attorney, Agent, or Firm*—C. S. Krikelis

[57] ABSTRACT

An improved wall fastener for hollow walls, the fastener having two spreadable anchoring blades designed to spread behind the wall following insertion of a screw thereinbetween. The fastener is made of thin sheet metal which has been hardened through a heat treating process, such as quenching. Complementary engaging means on the blades are used to hold the blades together during the heat treatment and to prevent the separation thereof until the screw insertion.

3 Claims, 3 Drawing Sheets

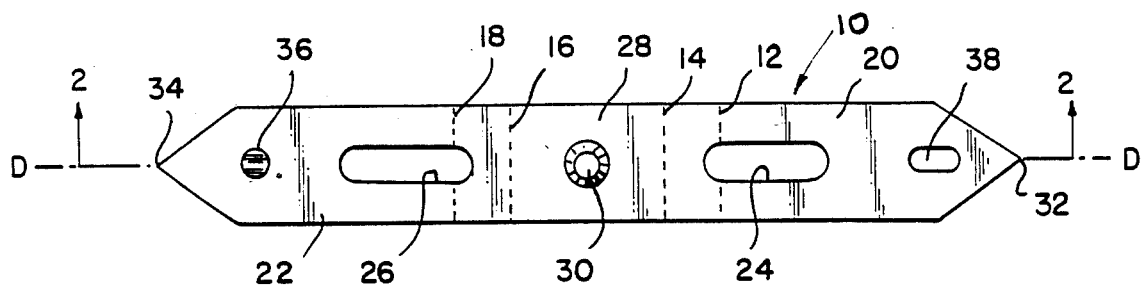
FIG. 1
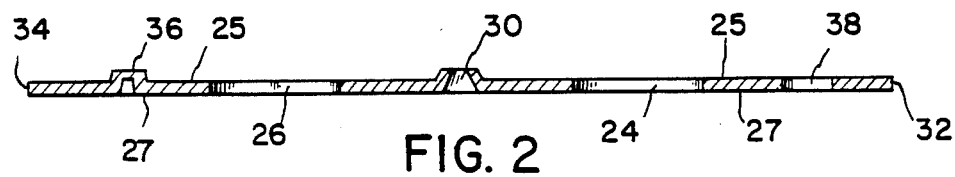
FIG. 2
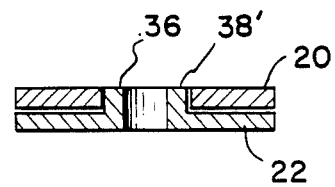
FIG. 4
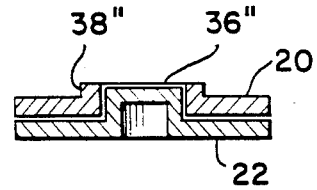
FIG. 6
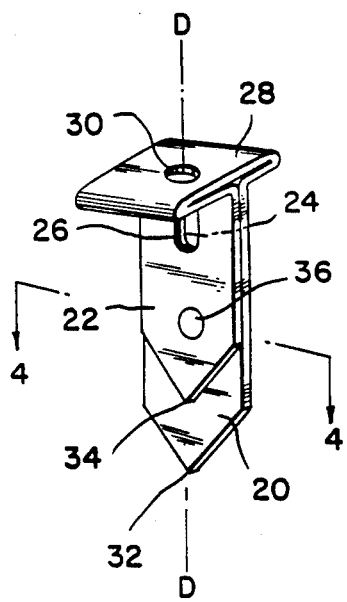
FIG. 3
FIG. 5

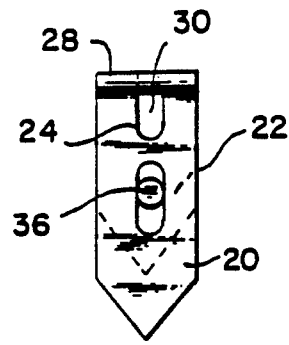
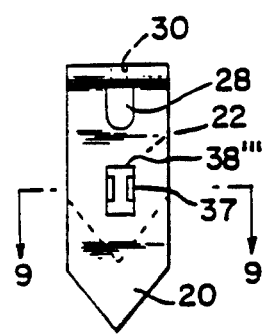
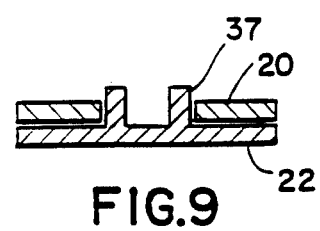
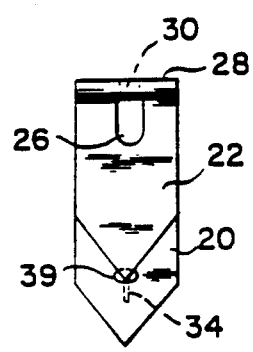
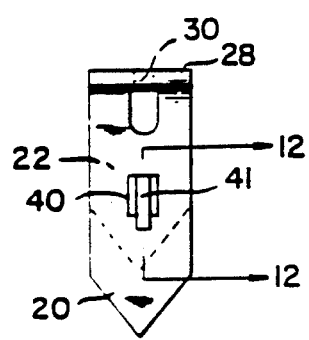
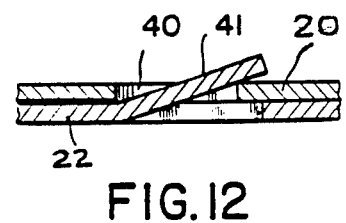
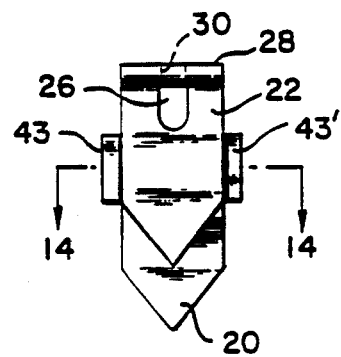
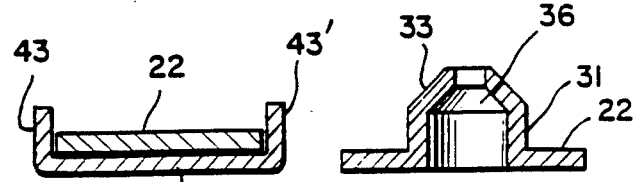

FIG. 16
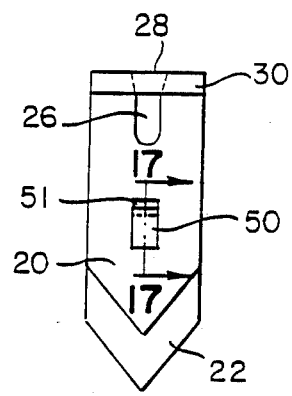
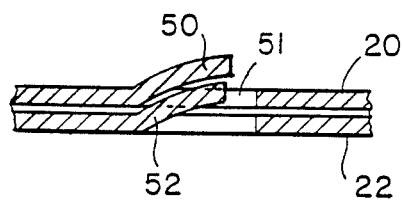
FIG. 17

4,941,340

METHOD OF FABRICATING WALL FASTENERS

CROSS REFERENCE TO RELATED APPLICATIONS

This application is a continuation application of Ser. No. 281,445 filed 12-8, 88, abandoned which is a divisional application of allowed application Ser. No. 085,154 filed on 08/14/1987 Pat. No. 4,874,227 which is a continuation-in-part of U.S. Pat. No. 4,765,788 (Ser. No. 1,756) filed on 01/09/1987.

FIELD OF THE INVENTION

This invention relates to a wall anchor and more particularly a wall anchor made from a folded thin piece of sheet metal which has been heat treated subsequently to the folding.

BACKGROUND OF THE INVENTION

Various designs of wall fastening have been in existence for a number of years. An advanced type is described in U.S. Pat. No. 4,500,238. It comprises a sword-like anchor made of thin sheet metal, having two spreadable pointed flat blades for easy insertion in a wall. After insertion, the blades are spread apart by driving a fasteners member, typically a screw, thereinbetween to provide resistance to withdrawal.

The ability of the anchor to enter the wall, and its holding power depend to a degree on the material used for the anchor, among other factors. Thus it is desirable to employ thin sheet metal of high strength, such as for example, spring steel metal or the like. However, to facilitate manufacturing, it is desirable to use a soft malleable material which can be easily shaped, cut and folded with conventional dies.

To satisfy both requirements, a soft malleable sheet of metal is first used to cut, shape and fold to produce the desired shape for the anchor. The anchor is then heat treated by heating and quenching then tempering at an appropriate temperature in accordance with well known technology to harden the metal. During the quenching step it has been found that the folded article under the treatment stresses has a tendency to resume its original unfolded shape. The result of this tendency is a partial separation of the blades especially near the tip thereof which renders the article inferior for its intended purpose and reduces productivity.

There is thus need for an inexpensive solution to the aforementioned problem and a need for an inexpensive way to hold the blades of such anchors in contact with each other during the hardening and particularly the quenching process.

SUMMARY OF THE INVENTION

A solution to the aforementioned problem is obtained by a wall fastening member design comprising a thin, sheet metal anchor having a substantially flat head portion and a hole therethrough, said hole having an axis perpendicular to the head. The axis extends through and is contained in the plane of a substantially flat neck adjacent said head. The neck includes an elongated opening therethrough extending in the plane of the neck the full length of the axis. First and second thin, flat sheet metal spreadable anchoring blades extend from the neck in the direction of the axis, coplanar with the neck, each having an inner and an outer surface, the inner surface of the first blade in close contact with the inner surface of the second blade, at least one of said blades terminating in a point; complementary engaging means are provided on each of the first and second blades, the engaging means of the first blade extending at least partially into the engaging means in the second blade.

Typically, the complementary engaging means may comprise a boss extending from the inner surface of the first blade into a cutout portion in the body of the second blade, the outer dimension of the boss being sized to frictionally engage at least a portion of the cutout sides with a frictional force sufficient to resist blade separation forces produced during quenching of the anchor, yet insufficient to prevent blade separation and spreading upon insertion of a fastener thereinbetween.

In the alternative the complementary engaging means may comprise a narrow, flexible strip portion of the first blade extending into snapping engagement through an aperture in the second blade.

It is also an objective of the present invention to provide a method of producing a wall fastening member of the type comprising a thin, sheet metal anchor having a substantially flat head portion and a hole therethrough, said hole having an axis perpendicular to the head, the axis extending through and contained in the plane of a substantially flat neck adjacent to said head, the neck including an elongated opening therethrough extending in the plane of the neck the full length of the neck along the axis, first and second thin, flat sheet metal spreadable anchoring blades extending from the neck in the direction of the axis, coplanar with the neck, each having an inner and an outer surface, the inner surface of the first blade in close contact with the inner surface of the second blade, at least one of said blades terminating in a point, the method comprising:

shaping, cutting and folding a thin malleable sheet of metal, engaging complementary engaging means on each of said first and second blades, and heat treating said anchor to harden the sheet metal.

The engaging step may comprise frictional engagement of a boss extending from one of the blades in an aperture in the other blade or it may comprise a snapping engagement of a portion of the first blade by a receiving opening in the second.

BRIEF DESCRIPTION OF THE DRAWINGS

The invention will be more fully understood from the following description taken in connection with the accompanying drawings in which:

FIG. 1 shows a plan view of a shaped and cut thin metal sheet prior to folding for the production of an anchor in accordance with this invention.

FIG. 2 shows an elevation cross-section taken along line 2—2 of FIG. 1.

FIG. 3 shows an anchor prepared in accordance with the present invention.

FIG. 4 shows a cross-section of the complementary engaging means employed in the structure of FIG. 3 to hold the blades together during quenching and tempering.

FIG. 5 shows a plan view of an embodiment of the present invention.

FIG. 6 shows a detailed elevation schematic of an alternate embodiment of the complementary engagement means.

FIG. 7 shows a plan view of yet another embodiment of this invention.

FIG. 8 shows a plan view of yet another embodiment of this invention.

FIG. 9 shows an elevation cross-section along line 9—9 of FIG. 8.

FIG. 10 shows a plan view of yet another embodiment of this invention.

FIG. 11 shows a plan view of yet another embodiment of this invention.

FIG. 12 is an elevation cross-section along line 12—12 of FIG. 11.

FIG. 13 shows a plan view of yet another embodiment of this invention.

FIG. 14 is an elevation cross-section taken along line 14—14 of FIG. 13.

FIG. 15 is a detailed schematic representation of a boss in accordance with this invention.

FIG. 16 is a plan view of the preferred embodiment of this invention.

FIG. 17 is a detailed cross-section taken along line 17—17 of FIG. 16.

DETAILED DESCRIPTION OF THE INVENTION

Throughout the following description similar reference numerals refer to similar elements in all figures in the drawings.

Referring now to FIG. 1 there is shown a piece of thin sheet metal 10 which has been shaped so that following folding along indicated fold lines, 12, 14, 16 and 18, will produce an anchor of the type shown in FIG. 3. Throughout this description when the term thin metal is used it is understood to mean sheet metal varying in thickness depending on the wall size and usually between about 0.005 inches (0.0127 cm) to 0.060 inches (0.15 cm). This thickness range has been selected to produce optimum holding power without significant damage to the wall the anchor is inserted in. Thicknesses below 0.005 inches do not provide sufficient strength for driving them forcibly, as by hammering, into a wall. Reinforcing ribs may optionally be provided to give additional stiffness to the anchor. Unless stated differently, an anchor in accordance with this invention is produced by a series of operations comprising first shaping the sheet metal through cutting then folding the shaped metal into a final shape resembling the depiction of FIG. 3 and finally heat treating the folded article through quenching, optionally followed by tempering treatment.

Referring back to FIGS. 1 and 2 the anchor is shown comprising two blades 20 and 22 terminating respectively to pointed ends 32 and 34. The portion between folding lines 12 and 18 forms the anchor head after folding, as better shown in FIG. 3. The head contains an opening 30 through which a fastener such as a screw may be threaded into the anchor to secure an article thereto.

Two openings 24 and 26 extend along the long dimension of the sheet metal piece in that portion of the blade adjacent the head which following the folding operation becomes the neck of the anchor. The neck is preferably simply an extension of the blades. In some structures, not shown here, as disclosed in the aforementioned U.S. Pat. No. 4,500,238 tabs extending from one of the neck portions enfold the other to assure that the blades will not spread but beginning at a point away from the head by a predetermined amount. The elongated openings 24 and 26 serve the purpose of allowing an inserted fastener to penetrate a given distance in the anchor before exerting a spreading pressure on the blades, thus also controlling the spreading point of the blades.

As better shown in FIG. 2 in accordance with this invention there are complementary engaging means on each of the blades cooperating to provide a force to hold the folded blades together during the heat treatment. In this embodiment the complementary means comprise a boss 36 stamped in one of the blades and a cutout 38 on the other.

An axis D—D extends the length of the shaped metal piece dividing it into two symmetrical sides. The boss 36, openings 24 and 26, a screw threading opening 30, and cutout 38 are located coaxially with axis D—D along its length. Upon folding of the sheet metal along the folding lines, the axis D—D assumes the orientation shown in FIG. 3, in which the head plane is perpendicular to the axis, while the blades extend in a plane containing the axis.

The blades have an inner surface 25 and an outer surface 27. Upon folding, inner surface 25 on the first blade 20 is brought against inner surface 25 on the second blade 22. Typically one blade is sized smaller than the other for easier wall penetration.

Boss 36 and cutout 38 are placed and sized to form complementary engaging means such that upon folding the boss 36 is inserted into the cutout 38. FIG. 15 shows a desirably shaped boss 36 which comprises a generally cylindrical body portion 31 rising substantially vertically from the inner surface of blade 22, topped with a conical section 33. The conical shape of the boss top allows easy insertion in the cutout 38. The diameter of the cylindrical portion of the boss is selected to enter cutout 38 with some resistance so that there is a frictional force opposing withdrawal of the boss once inserted.

In an alternate embodiment, the boss is generally circular, and so is the cutout as shown by numeral 38' in FIG. 5. With reference to FIG. 4 there is shown another possible boss 36 which has a crater-like form, open at the top, rising from the inner surface of blade 22 with walls substantially vertical, relative to the plane of the blade taken as horizontal. The walls of the crater-like boss are received and held by the sides of cutout 38' with sufficient frictional force to satisfy the aforestated requirements. The height of the boss walls has been sized so that following engagement in the cutout 38' they do not extend above the outer surface 27 of the blade in any substantial degree.

FIG. 6 depicts a slight variation of the embodiment shown in FIGS. 4 and 5. Boss 36" resembles 36, but is not open at the top. Furthermore the boss may extend above the surface of blade 20 as shown here, and the cutout 38" may also be shaped in a crater-like fashion extending in the direction of the boss providing extra frictional surface contact. So long as the amount by which the engaging means rise from the surface of the blades is small they are not detrimental to the operation of the fastener. On the other hand this structure is advantageous in cases combining the open top boss 36 of FIG. 4 with the cutout 38" of FIG. 6 to produce an engaging means that may be placed on the anchor through a single punching operation after folding.

FIG. 7 is a further variation of the subject of this invention, in which the cutout 38 is elongated. This structure is advantageous in mass production through automated equipment since it requires less accurate placement of the cutout relative to the boss and can compensate for folding slightly outside of the design folding lines. Of course in this embodiment the frictional force is provided by the engagement of the means only along a portion of their surfaces.

Another variation is shown in FIGS. 8 and 9 in which a square cutout 38''' is used in blade 20 to receive and frictionally engage two tabs 37 extending vertically from the inner surface of blade 22.

FIG. 10 shows yet another embodiment in which a small cutout 39 in the longer of the two blades, here blade 20, engages the tip 34 of blade 22. In this instance, the tip of the shorter blade may be designed with an elongation to allow easier and more positive insertion in the cutout 39. Insertion of the tip in the hole 39 prevents spreading of the blades during the heat treatment of the article, yet the elongated tip of the blade after treatment is flexible enough to snap out of the cutout and separate upon insertion of a fastener thereinbetween.

A further variation of this embodiment is shown in FIGS. 11 and 12 in which a small tab 41 has been bent up from one of the blades into snapping engagement in an opening 40 in the other. This arrangement operates much the same way as the one shown in FIG. 10.

A further and prefered variation of the embodiment shown in FIG. 11 is the embodiment of FIG. 16. As more clearly shown in FIG. 17, two tabs are punched out of the two blades. Tab 50 is punched out of blade 20 and tab 52 out of blade 22. Tab 52 is frictionaly inserted in space 51 left behind as tab 50 is punched and bent outwardly from the blade surface. An advantage of this arrangement is that the punching and bending operation can be done in one step; furthermore, the slope of the bent tabs is such that they present but negligible resistance to the insertion of the fastening member in the wall.

Finally there is yet another embodiment within the scope of this invention, shown in FIG. 13. In this instance, a certain portion of one of the two blades extending partially along its edges has been bent toward the other to create a channel defined by upturned right and left portions 43 and 43' into which the two sides of the other blade are frictionally engaged to hold the blades together during the heat treatment process.

Preferably, the engaging means will be placed near the tip of the shorter of the two blades. This position may, in some embodiments, coincide with the tip of the shorter blade as discussed above with reference to FIG. 10.

The above and similar modifications including various other combinations of the designs hereinabove disclosed will become obvious to the practitioners of the art and are within the contemplation and scope of our invention in which we claim:

1. A method for producing a wall fastener of the type comprising a thin, sheet metal anchor having a substantially flat head head portion and a hole therethrough, said hole having an axis extending through and contained in the plane of a substantially flat neck adjacent the head, the neck including an elongated opening therethrough extending in the plane of the neck the full length along the axis, first and second thin, flat sheet metal spreadable anchoring blades extending from the neck in the direction of the axis, co-planar with the neck, each having an inner and an outer surface, the inner surface of the first blade adjacent to the inner surface of the second blade, at least one of said blades terminating in a point, the method comprising the steps of:

shaping, cutting, folding and heat treating to harden a thin malleable sheet of metal, the improvement wherein comprises forming distinct complementary, disengageable engaging means on each of said first and second blades, the engaging means comprising complementary engaging surfaces on each of said engaging means in a plane substantially perpendicular to the plane of the blade, and, to present separation of the blades during the heat treating step, engaging said complementary engaging means prior to the heat treating step with a force sufficient to hold said blades with their inner surfaces adjacent to each other during the heat treatment and hardening steps, but insufficient to prevent the spreading of the blades upon insertion of a fastener thereinbetween.

2. A method in accordance with claim 1, wherein the step of temporarily attaching the first blade to the second blade further comprises engaging the complementary, disengageable, engaging means on the first and second blades frictionally.

3. A method in accordance with claim 1, wherein the step of temporarily attaching the first blade to the second blade further comprises snappingly engaging the complementary, disengageable engaging means on the first and second blade.

* * * * *